United States Patent [19]
Tomita et al.

[11] Patent Number: 5,670,961
[45] Date of Patent: Sep. 23, 1997

[54] AIRPORT SURFACE TRAFFIC CONTROL SYSTEM

[75] Inventors: Atsushi Tomita; Koichi Kimura; Shinichi Moriwaki, all of Tokyo, Japan

[73] Assignee: Mitsubishi Denki Kabushiki Kaisha, Tokyo, Japan

[21] Appl. No.: 562,064

[22] Filed: Nov. 22, 1995

[30] Foreign Application Priority Data

Nov. 24, 1994 [JP] Japan .................... 6-289787

[51] Int. Cl.$^6$ .................... G01S 13/87; G01S 13/91; G01S 13/93
[52] U.S. Cl. .................... 342/36; 342/37; 342/30
[58] Field of Search .................... 342/36, 30, 32, 342/37

[56] References Cited

U.S. PATENT DOCUMENTS

| | | | |
|---|---|---|---|
| 5,262,784 | 11/1993 | Drobnicki et al. | 342/45 |
| 5,334,982 | 8/1994 | Owen | 342/36 |
| 5,400,031 | 3/1995 | Fitts | 342/36 |
| 5,519,618 | 5/1996 | Kastner et al. | 364/439 |
| 5,530,440 | 6/1996 | Danzer et al. | 340/933 |
| 5,557,278 | 9/1996 | Piccirillo et al. | 342/29 |

FOREIGN PATENT DOCUMENTS

| | | |
|---|---|---|
| 3220486 | 9/1991 | Japan . |
| 2232316 | 12/1990 | United Kingdom . |

*Primary Examiner*—John B. Sotomayor
*Attorney, Agent, or Firm*—Rothwell, Figg, Ernst & Kurz

[57] ABSTRACT

An airport surface traffic system is provided which detects targets moving on an airport surface and automatically adds ID codes thereby reduces the controlling duties of an air traffic controller and elevates safety of an aviation control. An airport surface traffic system comprises airport surface monitoring radars which detects targets moving on an airport surface, ASDE target detector which detects targets by an output signal of the airport surface monitoring radars, a second monitoring radar which receives response signals from airplanes and from an airport monitoring radar which controls airport, ASR/SSR target detector which detects targets, ID code addition apparatus which adds an ID code to targets based on a signal from FDP which stores flight schedule data of airplanes and a multi-function display which displays targets.

7 Claims, 18 Drawing Sheets

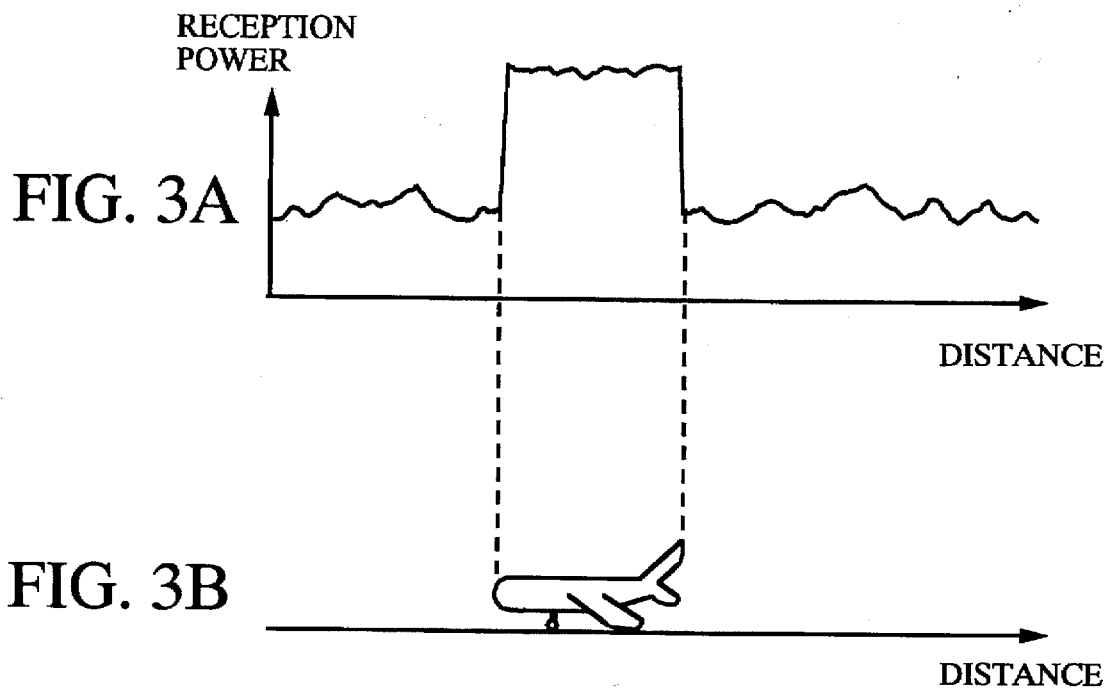
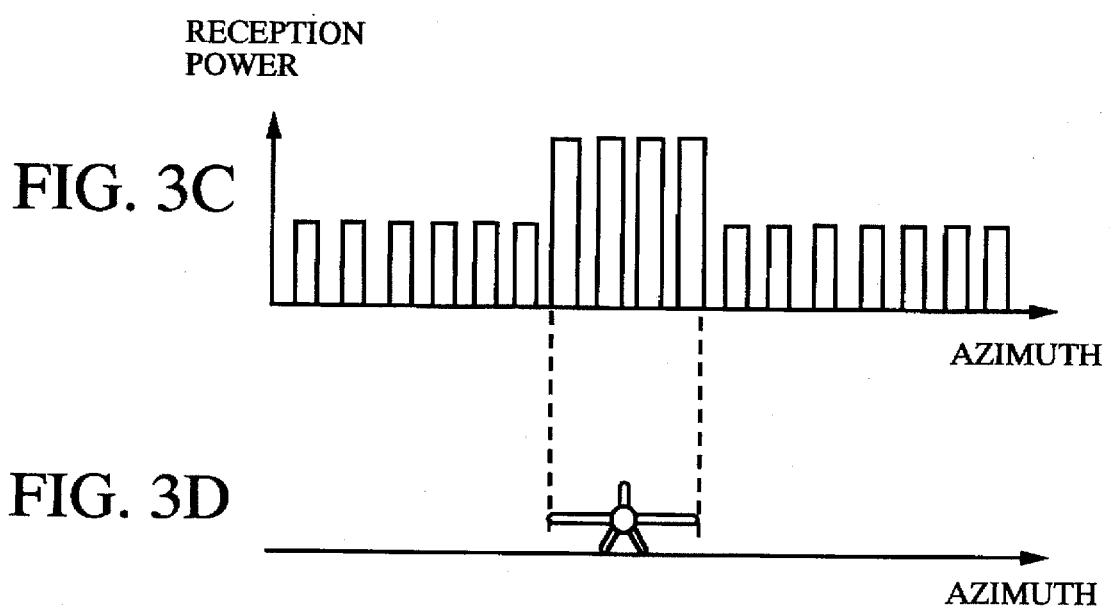

AIRPORT SURFACE TRAFFIC CONTROL SYSTEM

BACKGROUND OF THE INVENTION

1. Field of the Invention

The present invention relates to an airport surface traffic control system which controls airplanes and ground vehicles which move on the airport surface.

2. Description of the Prior Art

FIG. 18, for example, is a functional block diagram of an Airport Surface Detection Equipment (abbreviated as ASDE hereinafter) shown in Mitsubishi Denki Giho VOL.51, NO.10, PP 653 to 656, October 1977. The prior system comprises a radar antenna 1 which detects airplanes and vehicles on the airport surface, a transmitter 2 which transmits radio waves, a receiver 3 which receives radio waves emitted by transmitter 2, a scan converter 4 which converts a reception signal of a polar coordinate into a raster scan and outputs it as a television signal, a high intensity display 5 which displays a television signal in a high intensity, a circulator 7 which switches a reception wave 8 and a transmission wave 9.

An operation is explained here. A radar antenna 1 emits an electric wave transmitted by transmitter 2 to an airport surface. Receiver 3 receives radar echoes reflected from airplanes and so on which are moving on the airport surface. A reception signals 10 of a polar coordinate which are received by receiver 3, is converted to a raster scan from a polar coordinate by scan converter 4 and is outputted as TV signal 11 to high intensity display 5 which displays TV picture. High intensity display 5 displays radar echoes of airplanes and so on an analog multi-function display.

Since a conventional ASDE is constituted as described above, it is possible to display radar echoes of airplanes on analog multi-function display. But it does not have a function to detect targets automatically or to add ID codes. Air traffic controllers are therefore required to control airplanes by collating a shadow of airplanes displayed on a multi-function display with ID codes which they have memorized.

It is an object of the present invention to solve the problem mentioned above by automatically detecting airplanes moving on an airport surface and adding ID codes. Duties of air traffic controllers are thus reduced and the safety of an aviation control is more assured.

SUMMARY OF THE INVENTION

According to one aspect of the invention, an airport surface traffic control system comprises an airport surface detection radar for detecting targets moving in an airport; a first target detector for outputting location information of targets by calculating target location obtained from a signal outputted from the airport surface detection radar; a first monitoring radar for detecting targets in air area around airport; a second monitoring radar for receiving response signals from the targets; a second target detector for outputing location information of targets and beacon code information in response to target location information from the first monitoring radar and signals from the second monitoring radar; a flight schedule information processor for outputting flight schedule information of airplanes; an ID (identification) code addition apparatus for determining targets and their locations in response to location information outputted from the first and the second target detectors, adding ID code according to the beacon code information and the flight schedule information, and outputting location information and ID codes of targets as display data; a display apparatus for indicating locations of targets moving on the airport surface and symbols and ID codes corresponding to the targets in response to display data signals from the ID code addition apparatus.

According to another aspect of the invention, an airport surface traffic control system comprises a GPS transmitter carded on target airplanes for transmitting location information and ID code information of the targets which are calculated in response to signals received from the GPS satellite; a third target detector for receiving location information and ID code information of targets from GPS transmitter and decoding, and outputting said target locations and said ID code information to the ID code addition apparatus; where, the system determines targets and their locations according to location information of the first and the third target detectors, adds ID codes according to said code information received from the third target detector, and outputs location information and ID codes of the targets as display data.

According to further aspect of the invention, an airport surface traffic control system comprises an optical sensor for detecting areas where the airport surface detection radar can not detect; a fourth target detector for outputting location information of targets to the ID code addition apparatus according to said optical sensor; where, the system determines targets and their locations according to location information of the first and the fourth target detectors.

According to further aspect of the invention, an airport surface traffic control system comprises a collision forecasting apparatus for calculating possibility of future collision according to location change of the targets obtained from display data which are displayed on the ID code adding apparatus, and outputting a collision warning signal to the multi-function display when there is a risk of a collision; where, the system forecasts collision warning according to the collision forecasting warning signal.

According to further aspect of the invention, an airport surface traffic control system comprises at least three SSR mode-S (S indicates a type of modes) receivers for receiving SSR mode-S responses from the targets which are taking off and outputting reception signals; a location determination apparatus for determining location of targets according to reception signals from SSR mode-S receivers, and outputting location information and beacon code information of the targets to ID code addition apparatus; where, the system determines targets and their locations according to location information and the first target detector, and adds ID codes according to said beacon code information from the location determination apparatus.

BRIEF DESCRIPTION OF THE DRAWINGS

FIG. 3 is a plan which shows a relationship of targets and a reception signal of an embodiment of the invention.

DETAILED DESCRIPTION OF THE PREFERRED EMBODIMENTS

In an airport surface traffic control system of the invention, the first target detector calculates target location from a reception signal of an airport surface detection radar and outputs a location information of targets, the second target detector outputs a location information and beacon code information of targets in response to target location information from the first monitoring radar and reception signals from the second monitoring radar. An ID code addition apparatus determines targets and their locations obtained in response to location information outputted from the first and the second target detectors, adds ID code according to the beacon code information and the flight schedule information, and outputs location information and ID codes of targets as display data. A display apparatus displays symbols and ID codes corresponding to targets and their locations which are moving on the airport surface in response to display data signals.

A Global Positioning System transmitter which is carded on target airplanes transmits a location information and ID codes information of targets calculated from reception signals from a Global Positioning System satellite, a third target detector receives target location and ID codes information to decode and outputs them to the ID code addition apparatus. The system determines targets and their locations according to location information of the first and the third target detectors, adds ID codes according to said code information received from the third target detector, and outputs location information and ID codes of the targets as display data.

An optical sensor detects areas where the airport surface detection radar can not detect, a fourth target detector outputs location information of targets to the ID code addition apparatus according to said optical sensor. The system determines targets and their locations according to location information of the first and the fourth target detectors.

A collision forecasting apparatus inputs a display data from ID code addition apparatus and calculates possibility of future collision according to location change of the targets obtained from display data which are displayed on the ID code adding apparatus, and outputs a collision warning signal to the multi-function display when there is a risk of a collision.

At least three SSR mode-S receivers receive SSR mode-S responses from the targets which are taking off. A location determination apparatus determines location of targets according to reception signals from SSR mode-S receivers, and outputs location information and beacon code information of the targets to ID code addition apparatus. The system determines targets and their locations according to location information and the first target detector, and adds ID codes according to said beacon code information from the location determination apparatus.

DETAILED DESCRIPTION OF THE PREFERRED EMBODIMENTS

Embodiment 1

Figure 1:
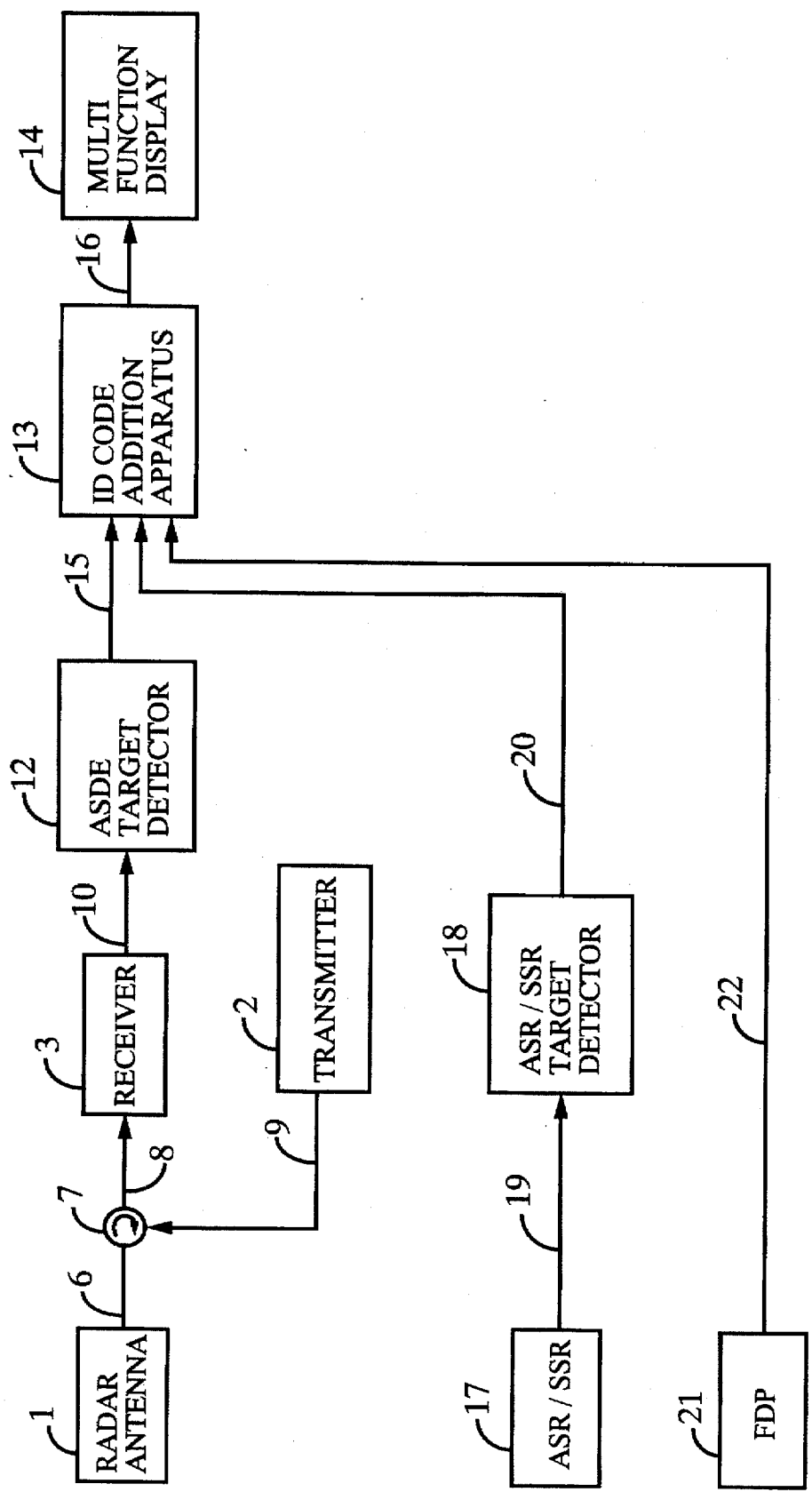
FIG. 1 is a functional block diagram which shows an embodiment of the invention.

An embodiment of the present invention is explained below using FIG. 1. FIG. 1 is a functional block diagram of an airport surface traffic control system in an embodiment of the present invention.

Figure 18:
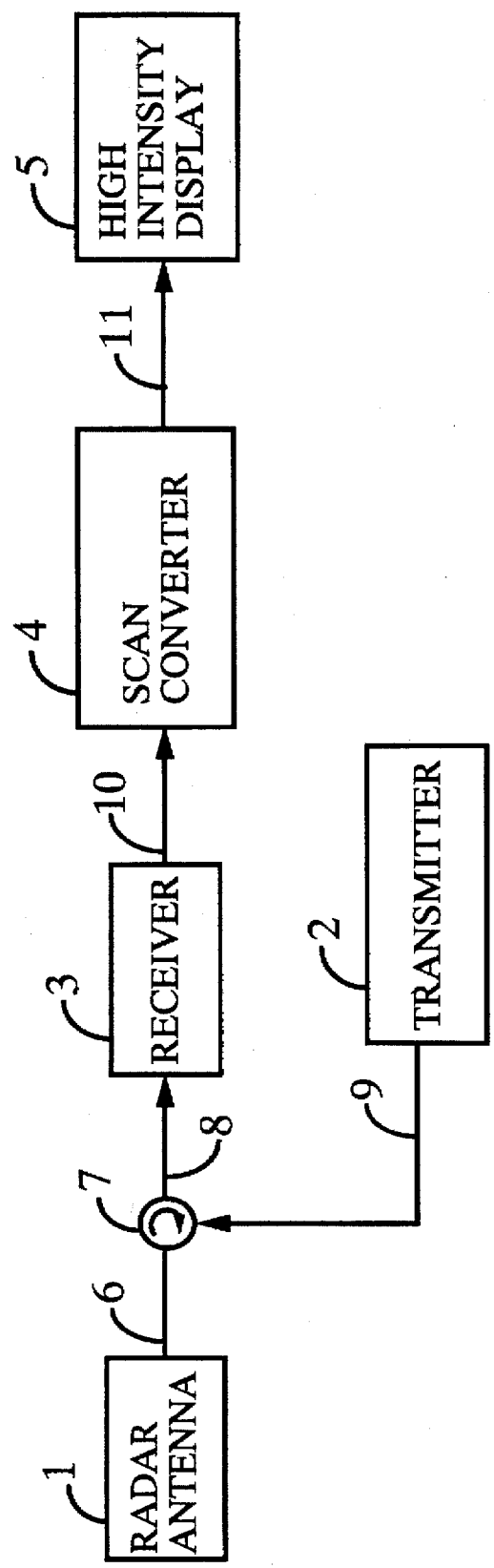
FIG. 18 is a functional block diagram which shows a conventional embodiment.

In FIG. 1, the system comprises a first ASDE target detector 12 which detects targets by judging a continuity of radar echoes in an azimuth and a distance direction using reception signals 10 of ASDE, an ID code addition apparatus 13 which adds ID codes such as call sign to ASDE detection target, a multi-function display 14 which indicates airplanes moving on an airport surface. The system further comprises an ASR/SSR 17 constituting an Airport Surveillance Radar (ASR) which controls an arrival and a departure of the airplane which are in outskirts air area of the airport according to radar echoes, and a Secondary Surveillance Radar (SSR) which transmits code pulses to the airplanes from an interrogator on the ground and receives and decodes specific code pulses received from a transponder in the airplane which is transmitted in response to the coded pulse transmitted from the interrogator, an ASR/SSR target detector 18 as a second target detector which detects targets from the outputted radar echo of ASR/SSR, a Flight Data Processor 21 (FDP) which stores database containing a flight route and a flight name of airplanes. The elements having the same reference numbers in FIG. 1 as those of FIG. 18 are the same portions or the corresponding portions. Accordingly the detailed explanation of the same portions is omitted.

Figure 2:
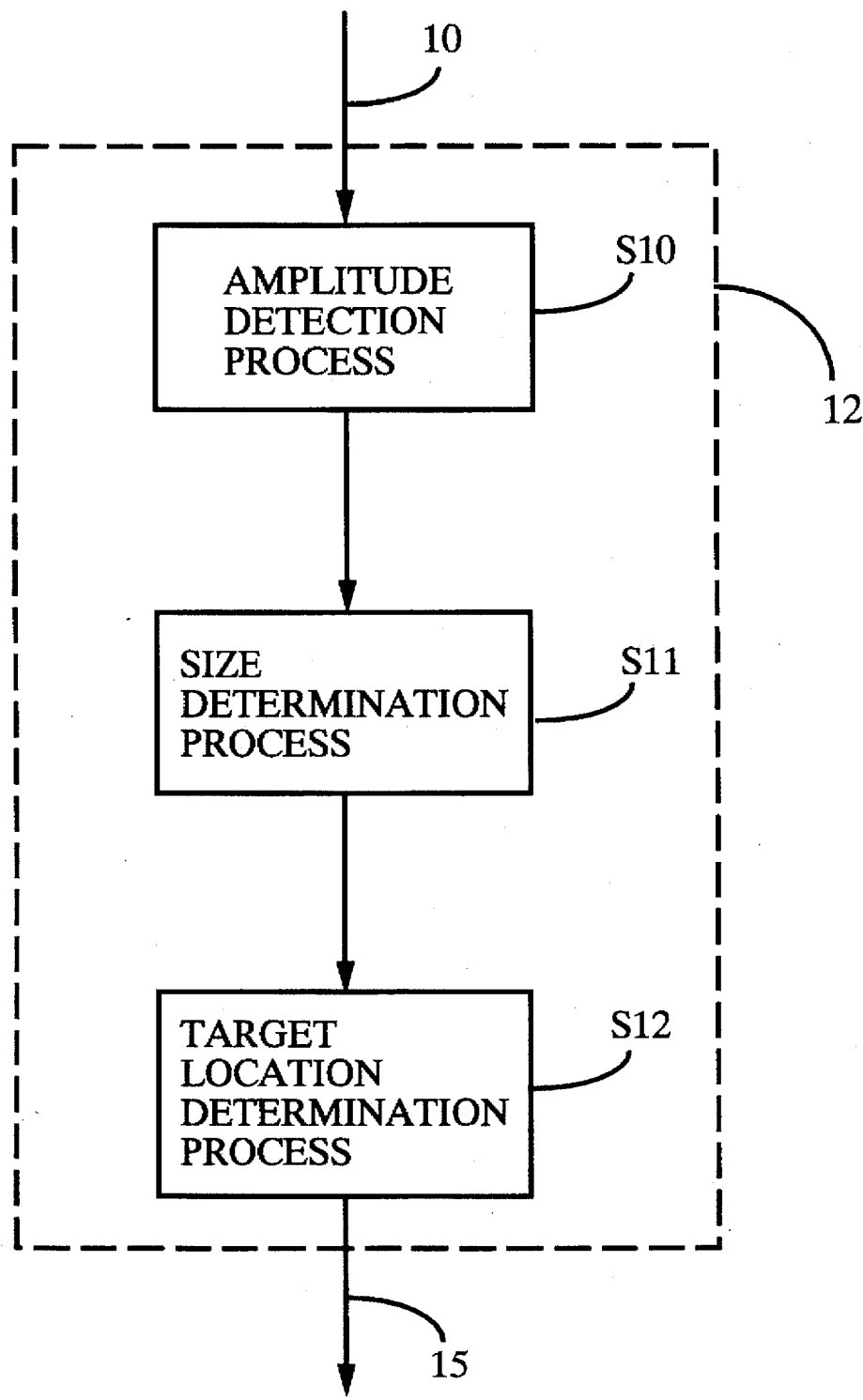
FIG. 2 is a process chart which shows a embodiment of the invention.

Principle of operation is explained using FIGS. 1, 2 and 3. A pulse of submillimeter wave which is emitted by the transmitter 2 via the radar antenna 1 hits buildings, airplanes or vehicles in the airport and each return pulse is converted to reception power by a receiver 3 via the radar antenna 1 and is outputted as a reception signal 10.

The radar antenna 1 emits a pulse of sub-millimeter wave to all 360° azimuth directions and obtains reception signals having many pulse repetition periods from all azimuth directions.

The reception signal 10 is thus constituted of two-dimensional signals of distance and azimuth. ASDE target detector 12 detects the airplanes automatically in response to a magnitude of reception signals from reception signal 10 and magnitude of distance direction and azimuth direction according to processes shown in FIG. 2.

A magnitude detection process of step S10 in FIG. 2 detects peaks of magnitude as targets, a size determination process of step S11 determines targets by comparing magnitudes of distance direction and azimuth direction with given data and target location determination process of step S12 determines targets by calculating central locations of each targets.

FIGS. 3 (*a*)–(*d*) show a relationship of airplane targets and reception signal. FIGS. 3 (*a*), (*b*) show peak power of radar echo magnitude and FIGS. 3 (*b*), (*d*) show location of a target airplane.

ASR/SSR 17 receives radar echoes or response signals from airplanes which are in air area around the airport, and outputs reception signals. ASR/SSR target detector 18 as a second target detector which detects targets from the outputted radar echo of ASR/SSR 17 outputs an information signal of location of airplanes and beacon code according to the reception signal from ASR/SSR 17. FDP 21 stores a database regarding flight routes and flight names of airplanes and outputs data signals of flight plans.

ASDE target detector 12 is able to detect targets within about three nautical miles from the airport and ASR/SSR target detector 18 is able to detect targets within about 70 nautical miles from the airport and an ASR/SSR target detector 18 detects information of airplanes at departure and arrival.

Figure 4:
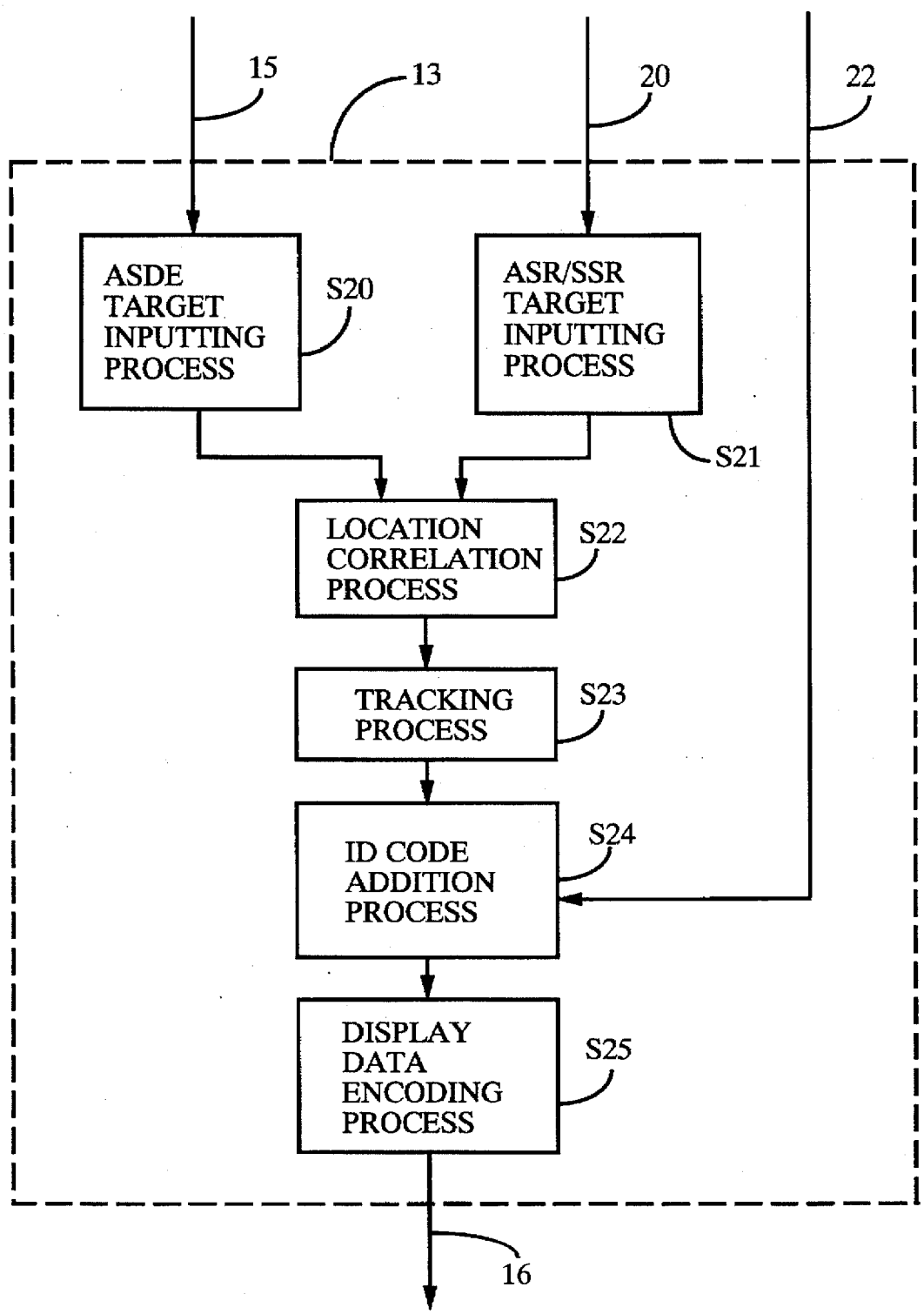
FIG. 4 a process chart which shows an embodiment of the invention.

An operation of ID code addition apparatus 13 is explained using a process chart of FIG. 4. Since ASR/SSR and ASDE are different kinds of radars, an ASDE target input process of step 20 and an ASR/SSR target input process of step 21 have asynchronized timing for their respective data inputs. And resolutions of target location inputs are also different. Therefore, two inputs (ASR/SSR and ASDE) are coordinated in the processes 20 and 21.

Next, in a location correlation process of step S22 coordinates respective targets detected by different radars by modifying a resolution and timing of different radars. A landing airplanes emit beacon from their transponder in response to an inquiry signals from SSR until just before entering an airport vicinity. The airplanes then stop emitting beacon fight after they enter into ASDE cover area and they can no longer detect SSR signal. Therefore, overlapping areas of ASR/SSR and ASDE are arranged to determine locations of the airplanes in ASDE cover area using location correlation between airplanes and then beacon codes are transferred. In concretely speaking, since error areas obtained from a resolution of ASR/SSR target detection and error areas obtained from a resolution of ASDE target detection are different from each other, locations of the targets are determined by taking correlation as a same targets which are within a predetermined area even if centers of targets obtained by the two kinds of radars do not match each other. In a tracking process of step S23, tracking filters such as α-β filter and Kalman filter track targets of which correlation process of location have been finished.

An ID code addition process of step S24 collates beacon codes memorized in a flight plan received from FDP 21 with airplane targets, which have carried out the location correlation and transferred beacon codes, and then add a flight number and so on.

Location information and ID code information of the airplane identified by ID code addition process of step S24 are encoded by display data encoding process of step S25, and are outputted as display data 16.

Display data 16 outputted from ID code addition apparatus 13 is inputted to the multi-function display 14. A target which is graphically symbolized by a drawing application software capable of multi-window display is then digitally displayed together with ID code. An example of this display is shown in FIG.5.

Figure 5:
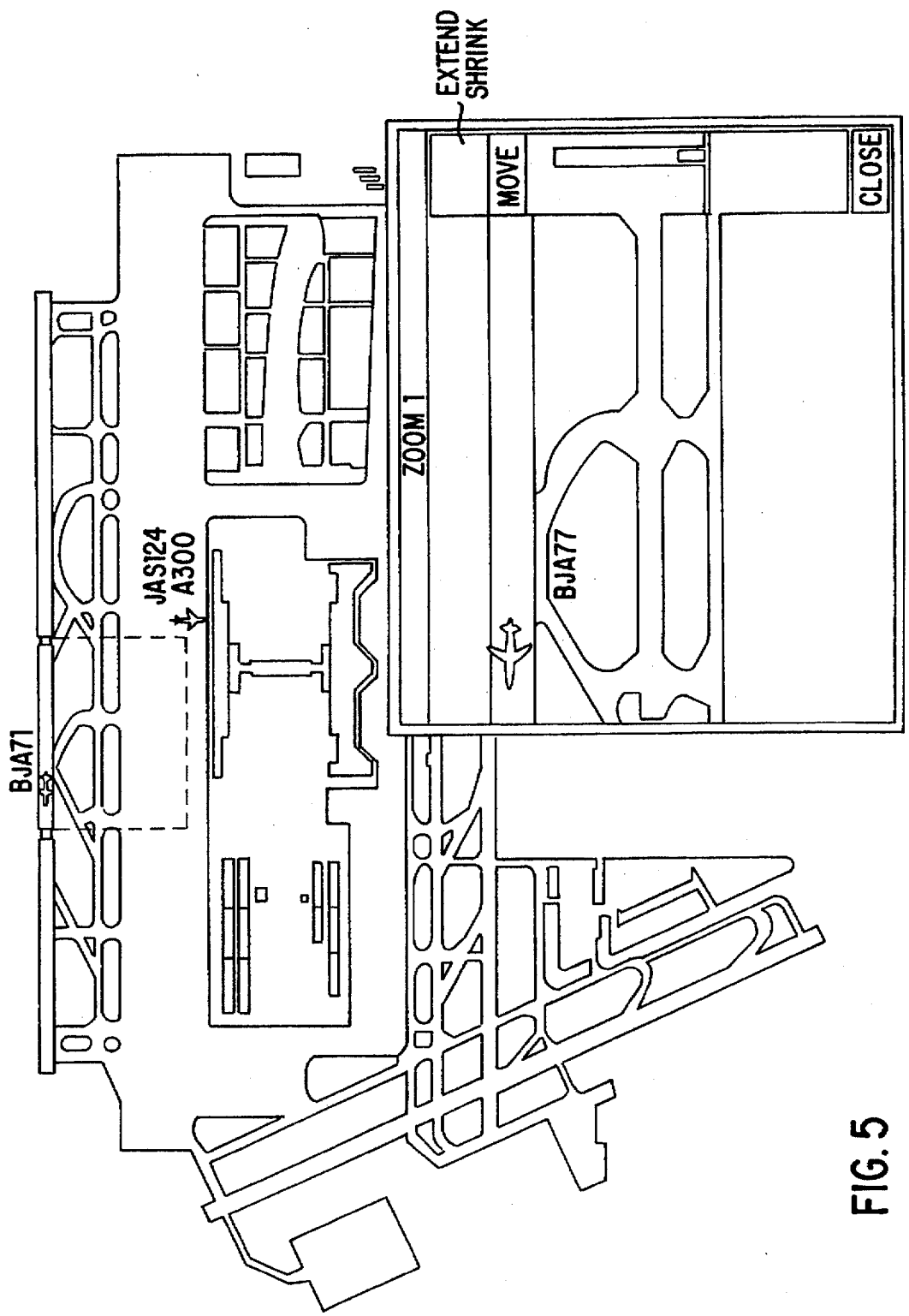
FIG. 5 is a plan which shows an embodiment of the invention.

FIG. 5 shows an example of a final man machine interface of the present invention. The conventional apparatus has displayed only analog video in which an ASDE radar video is scan converted. The present invention makes it possible to display symbols (digital display) which simulates a whole shape of an airport, buildings and shapes of airplanes by superposing them on the conventional scan converted analog radar video. Further, multiwindow makes it possible to display a plurality of analog radar videos and digital videos on one display screen.

As described above, according to the embodiment of the present invention, the targets are automatically detected, the ID codes are automatically added. Then, targets are symbolized so that they are digitally displayed on the multi-function display as well as the ID codes, which makes the display screen easy to be seen. The duties of the air traffic controllers are reduced as a result and airport safety is more assured.

Embodiment 2

Figure 6:
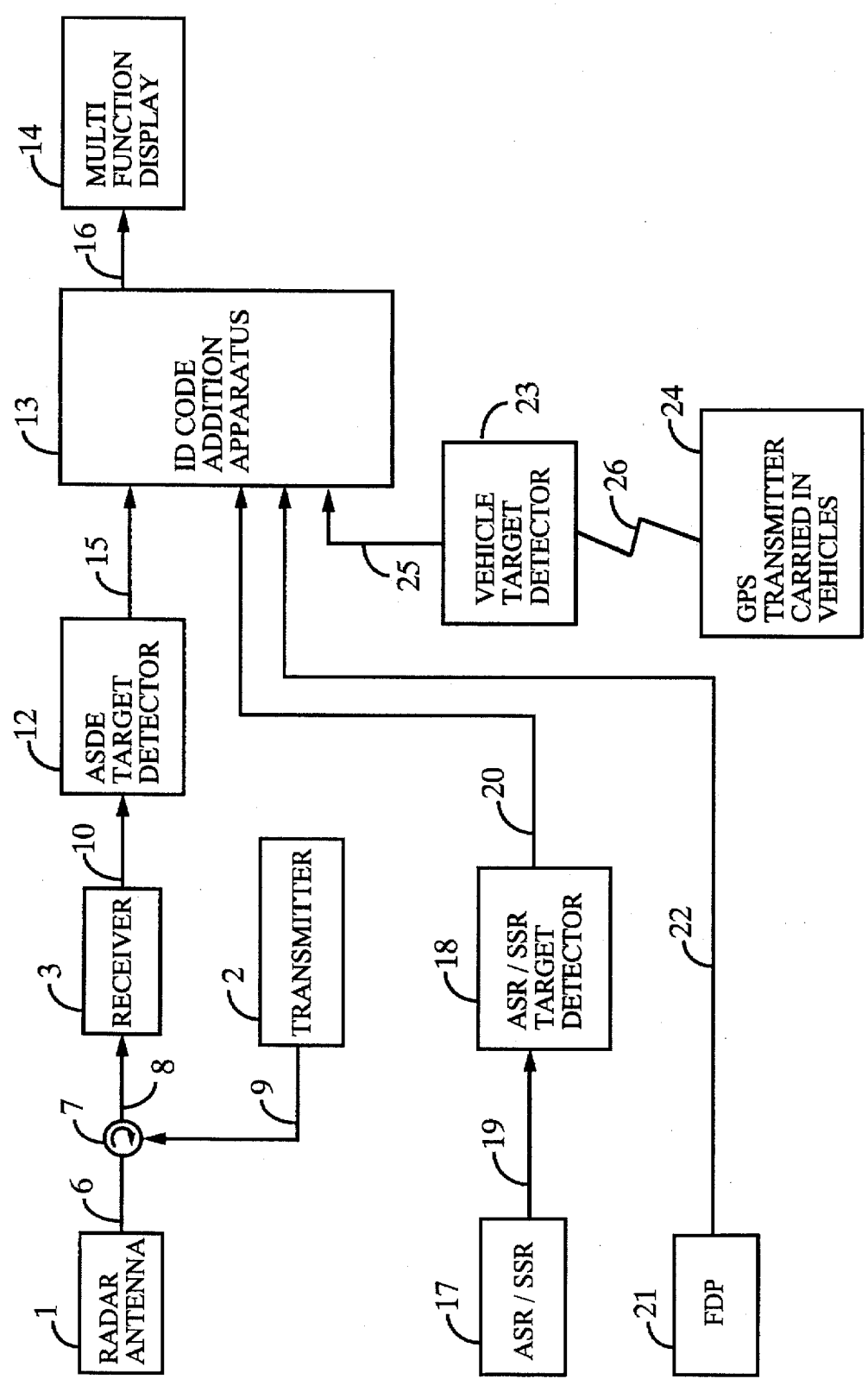
FIG. 6 is a functional block diagram which shows another embodiment of the invention.

In the first embodiment, a system is shown, which automatically detects airplanes which have just landed and adds ID codes. As shown in FIG. 6, another embodiment can also add ID numbers to vehicles moving on the airport surface by connecting a vehicle target detector 23 and a GPS transmitter 24 carded on vehicles to the systems.

The second embodiment is explained below using figures. FIG. 6 is a functional block diagram of a second embodiment showing a traffic system on an airport surface. The system comprises a GPS transmitter 24 carded in vehicles which transmits self location and ID codes. The system further comprises a vehicle target detector 23 as a third target detector which receives and detects a target locations and ID codes from a GPS transmitter loaded on vehicles. The elements having the same reference numbers in FIG. 6 as those of FIG. 1 are the same portions or the corresponding portions. Accordingly the detailed explanation of the same portions is omitted.

Figure 7A:
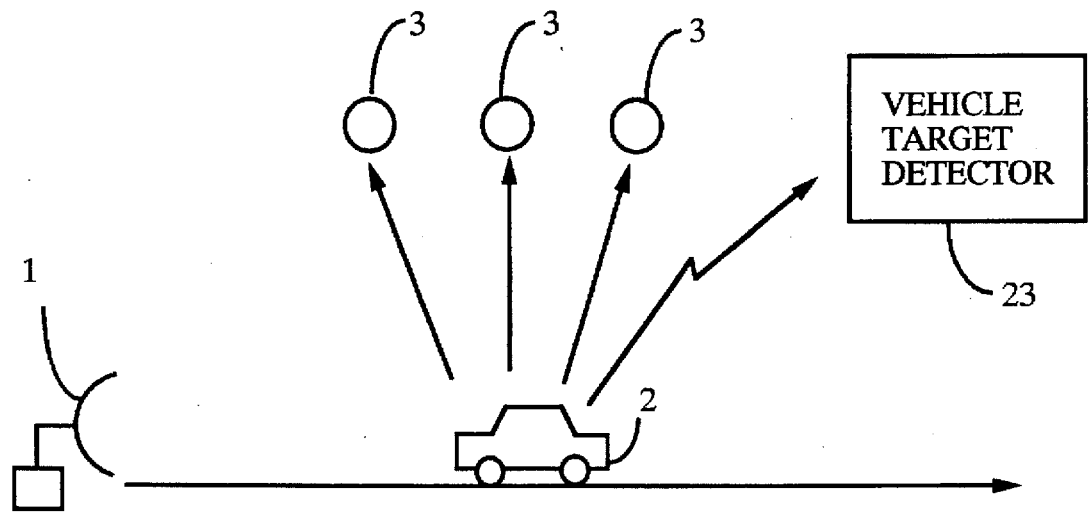
FIG. 7 is a plan which shows a relationship of targets and a reception signal of another embodiment of the invention.
Figure 7B:
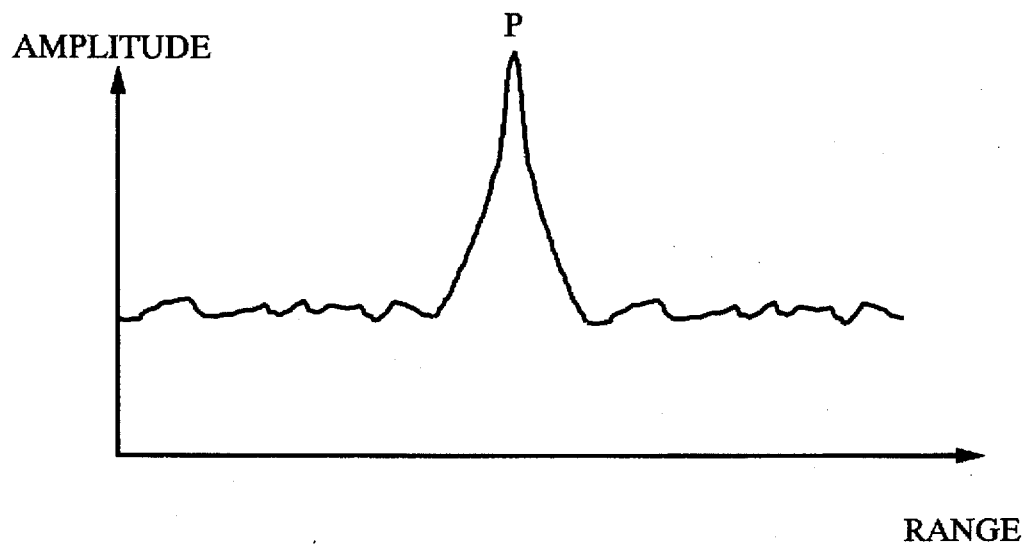
Figure 8:
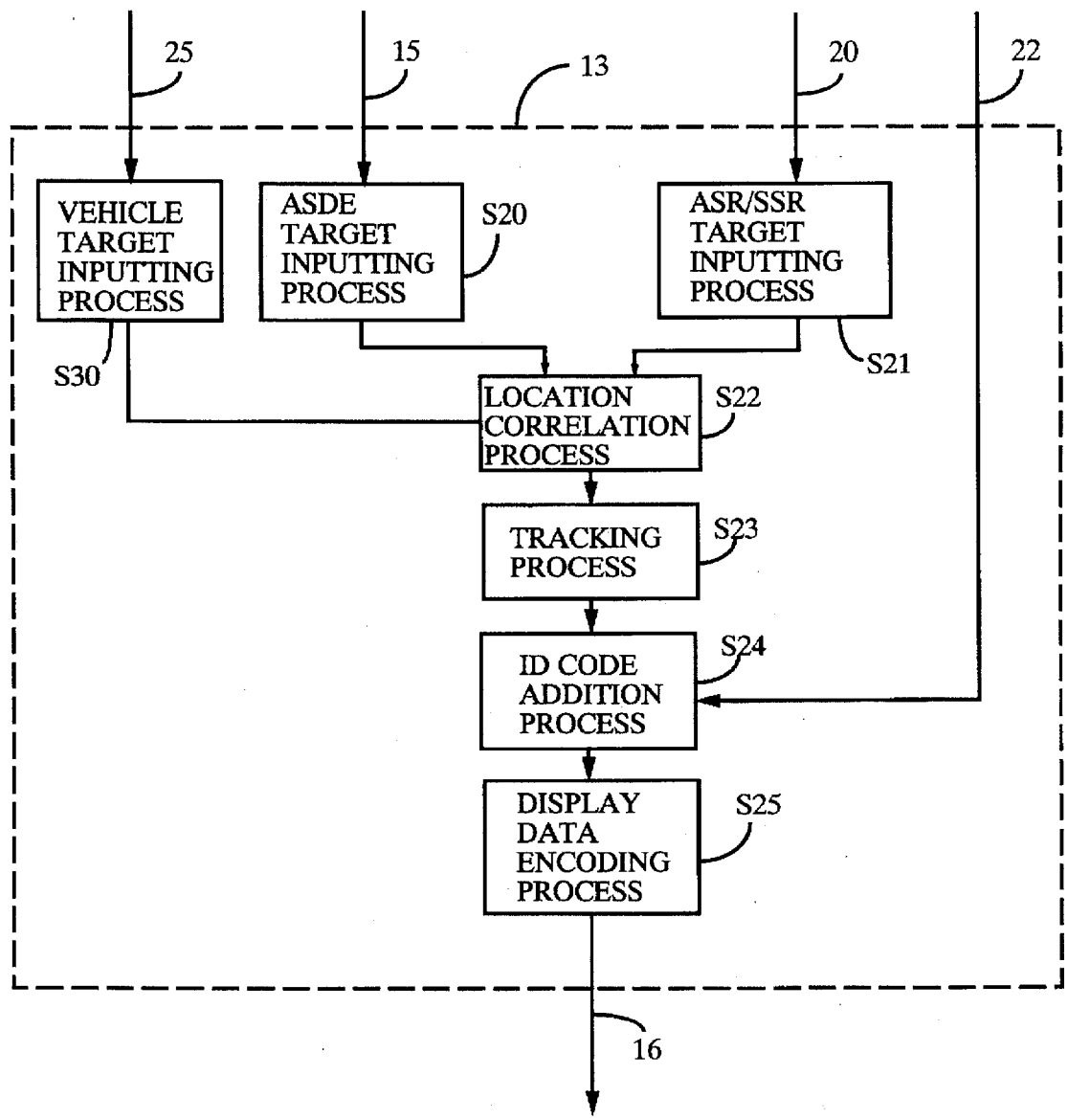
FIG. 8 shows a process chart which shows another embodiment of the invention.

An operation is explained using FIG. 6, FIG. 7 and FIG. 8. Radar echoes of vehicles as well as airplanes are detected by ASDE target detector 12 as magnitudes of reception signal 10. But, unlike airplanes which fly according to a flight plan, vehicles do not receive ID codes information via flight plan signal 22 outputted from FDP 21. In order to add ID numbers to vehicles, as shown in FIG. 6, GPS receivers carried in vehicles calculate their locations using time of radio waves emitted from GPS satellite by means of principle of trigonometrical survey. Vehicle locations are then assigned to the vehicles in the airport. GSPS transmitter 24 transmits them both as a radio wave 26 including vehicle locations and vehicle numbers. A vehicle location detector 23 receives radio wave 26 including vehicle locations and vehicle numbers and decodes them and outputs them as communication radio information 25 including vehicle locations and vehicle numbers to ID code addition apparatus 13.

In FIG. 7A, radio wave emitted from ASDE antenna 1 is reflected by a vehicle 2, and the reflected wave from vehicle 2 is received at vehicle target detector 23 as amplitude p in FIG. 7B. At the same time, GPS measuring apparatus carried in vehicle 2 receives radio wave from satellite 3 to measure its position. The position obtained in this way is transmitted to a vehicle target detector 23 by a GPS transmitter 24 carried in vehicle 2 and by the radio wave 26 including vehicle locations and vehicle numbers.

ID code adding apparatus 13 collates radar echoes from a vehicle which are detected by ASDE target detector with their locations, and outputs vehicle locations and vehicle numbers to the multi-function display apparatus 14 as display data 16 as described in the first embodiment. To put it more concretely, as shown in a process chart of FIG. 8, a vehicle target input process of step S30 coordinates an ASDE target input of step S20 with an ASR/SSR target input of step S21, as described in the first embodiment.

Next, in a location correlation process of step S22, since there are location error areas obtained by vehicle target detector 23 and location error areas obtained by ASDE target detector 12, a location correlation is calculated to identify targets to be the same location in consideration of errors, if centers of targets do not accord but are within a predetermined area. In tracking process of step S23, a tracking filter tracks targets of which correlation process of location has been finished. ID code addition process of step S24 adds ID codes to a vehicle.

A location information and ID codes of vehicles identified by ID codes addition process of step 24 are encoded by display data encoding process of step S25, and are outputted as a display data 16 to multi-function display 14 in order to display symbol by a graphic drawing. The above process is explained with regard to vehicles, but the process with regard to airplanes is the same as that of the first embodiment.

As described above, even if vehicles do not have ID code information allocated by a flight schedule information processor, they can be automatically detected, and ID codes are also automatically allocated to them. Therefore, the duties of the air traffic controllers are reduced as a result and airport safety is more assured.

In the present embodiment, a vehicle target detector and GPS transmitter carried in the vehicles are connected to the construction of the first embodiment, and ID numbers are added to vehicles moving on an airport surface. But the embodiment can also be applied to other moving object other than vehicles.

Embodiment 3

Figure 9:
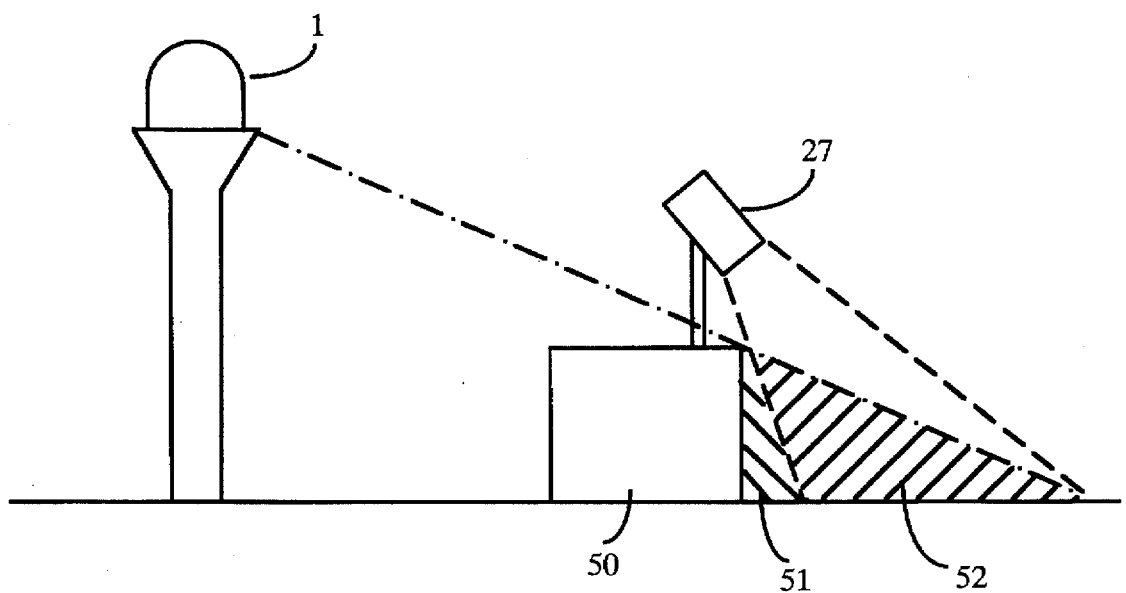
FIG. 9 is a diagram which shows a blind area of another embodiment of the invention.
Figure 10:
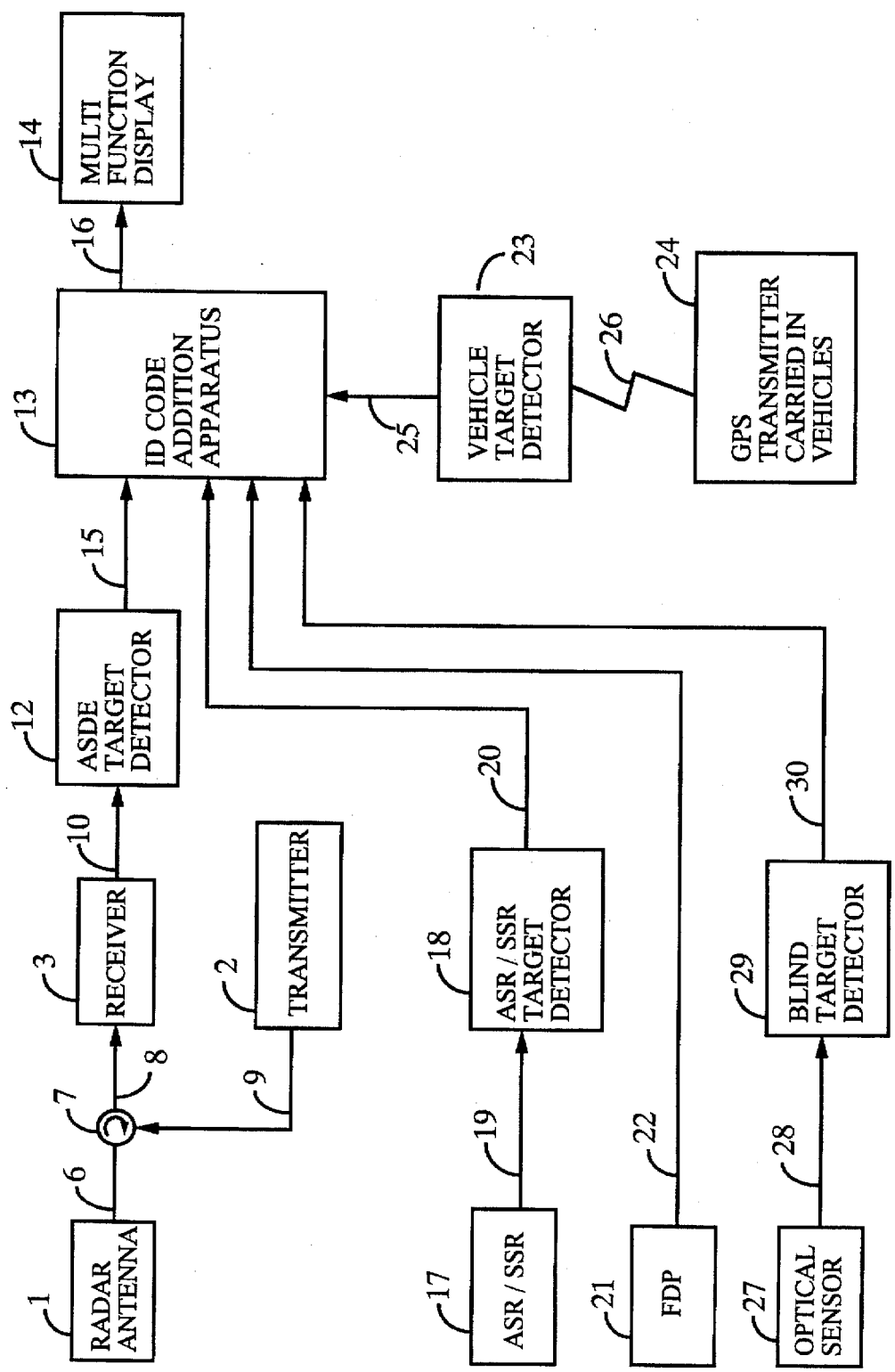
FIG. 10 is a functional block diagram which shows another embodiment of the invention.

The above second embodiment describes a system which automatically detects airplanes and vehicles and adds ID codes to them. However, as shown in FIG. 9, ASDE may cause blind areas 51 and 52 where radio waves of radar antenna 1 are blocked by buildings 50 and so on. As shown in FIG. 10, it is possible to monitor an entire airport surface by connecting an optical sensor 27 and a blind target detector 29. It also has an advantage that use of the optical sensor 27 does not interfere other radio waves in the airport.

The invention of the embodiment is explained below. FIG. 10 is a functional block diagram showing an airport surface traffic system. The system comprises an optical sensor 27 such as a visible camera or such as far infrared camera, a blind target detector 29 for processing picture image.

Figure 11:
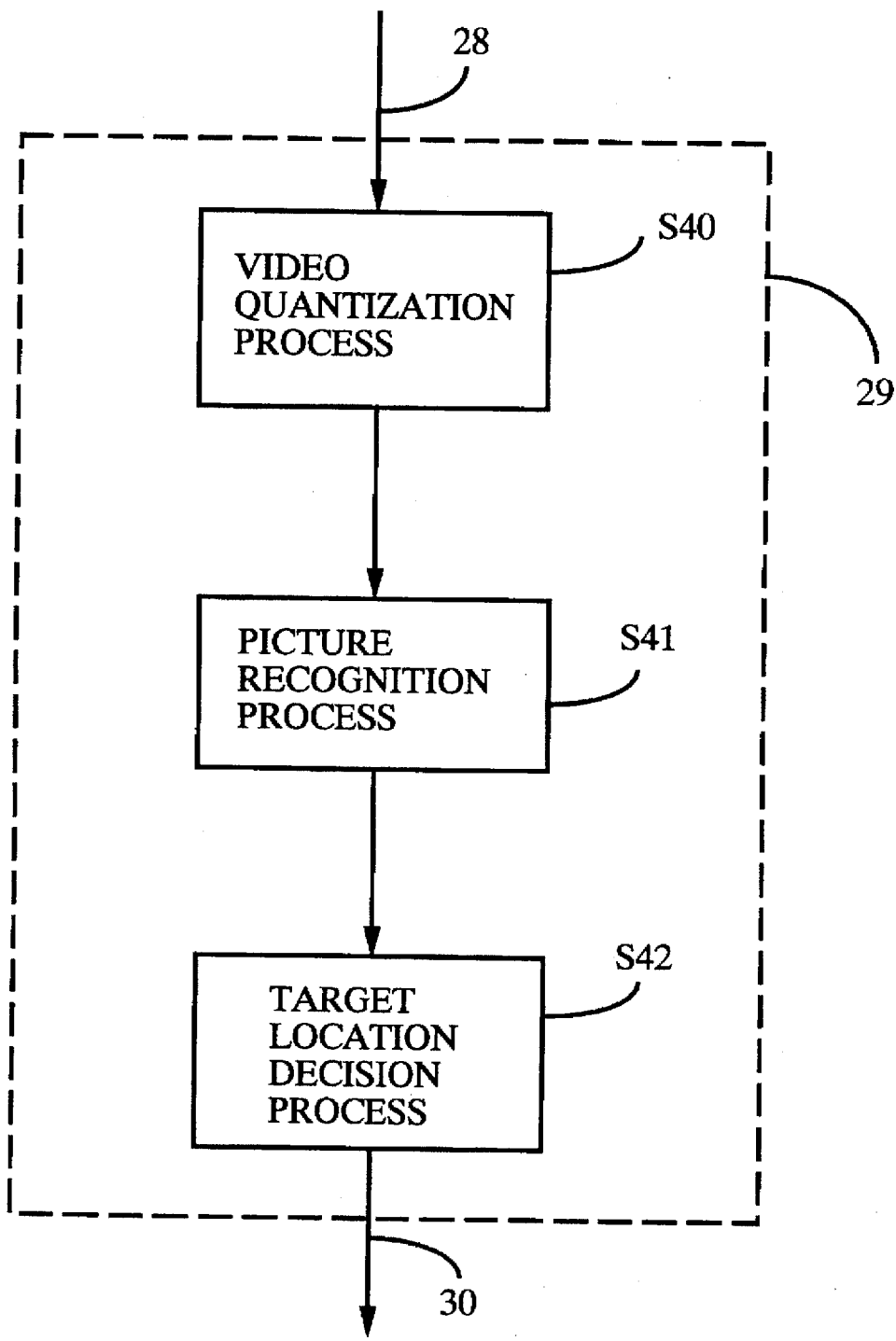
FIG. 11 shows a process chart which shows another embodiment of the invention.

FIG. 10 and FIG. 11 are explained below. Optical sensors 27 are equipped to apron illumination towers and an airport building and so on, for example, which monitor areas where become blind spots of radar antenna 1 and outputs area information as opto-electric signals 28 to blind target detector 29.

The blind target detector 29 detects targets such as airplanes using image process which recognizes picture images by pattern, and converts the targets to longitude and latitude information of the airport, and outputs target locations as blind target location signals 30 to ID code addition apparatus 13.

The concrete process of target detector 29 are shown in FIG. 11. A video quantization process of step S40 carries out A/D-conversion of an video signal obtained from optical sensor 27. A picture recognition process of step S41 detects luminance changes of pixel between the present frame picture and the preceding frame picture. Step S42 decides targets from the luminance change of the pixel in reference to their sizes and velocities, and outputs target locations if the pixels are assumed as targets.

Figure 12:
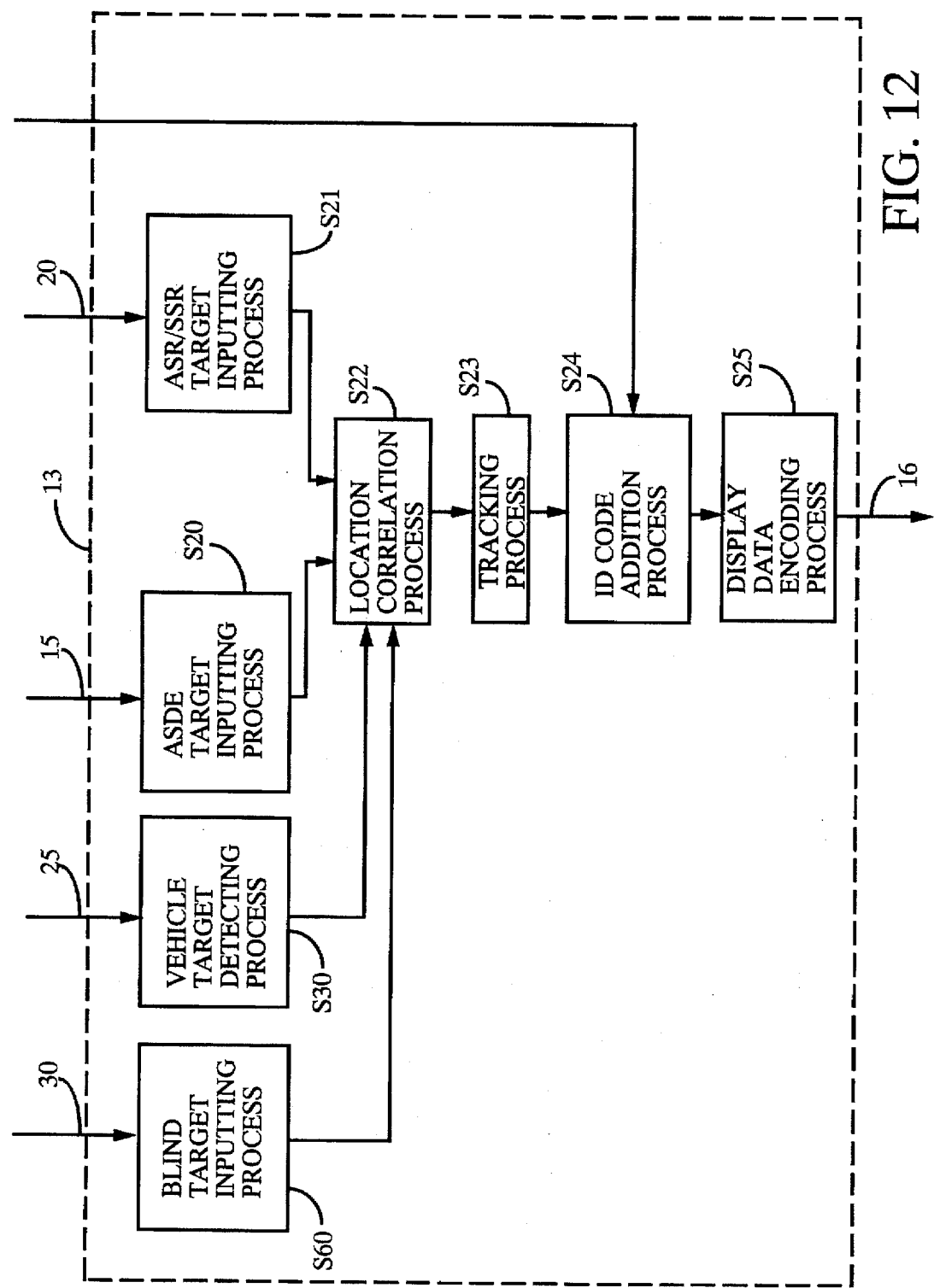
FIG. 12 shows a process chart which shows another embodiment of the invention.

The process of ID code addition apparatus 13 is similar to that of the first embodiment 1. As shown in a process chart of FIG. 12, a blind target detector 29 coordinates an ASDE target input signal of step S20 and an ASR/SSR target input signal of step S21.

In a location correlation process of step S22, since there are location error areas obtained by vehicle target detector 23 and location error areas obtained by an ASDE target detector 12, a location correlation is calculated to identify the targets to be in the same location in consideration of errors, if centers of targets do not accord but the targets are within a predetermined area. In step S23, a tracking filter tracks targets of which correlation process of locations have been finished, and then outputs location information and ID codes to a multi-function display 14 in order to display symbols of the targets by means of graphic drawing.

As described above, this embodiment enables to monitor entire airport surface. It also has an advantage that use of the optical sensor 27 does not interfere other radio waves in the airport. Thus airport safety is more assured.

Embodiment 4

Figure 13:
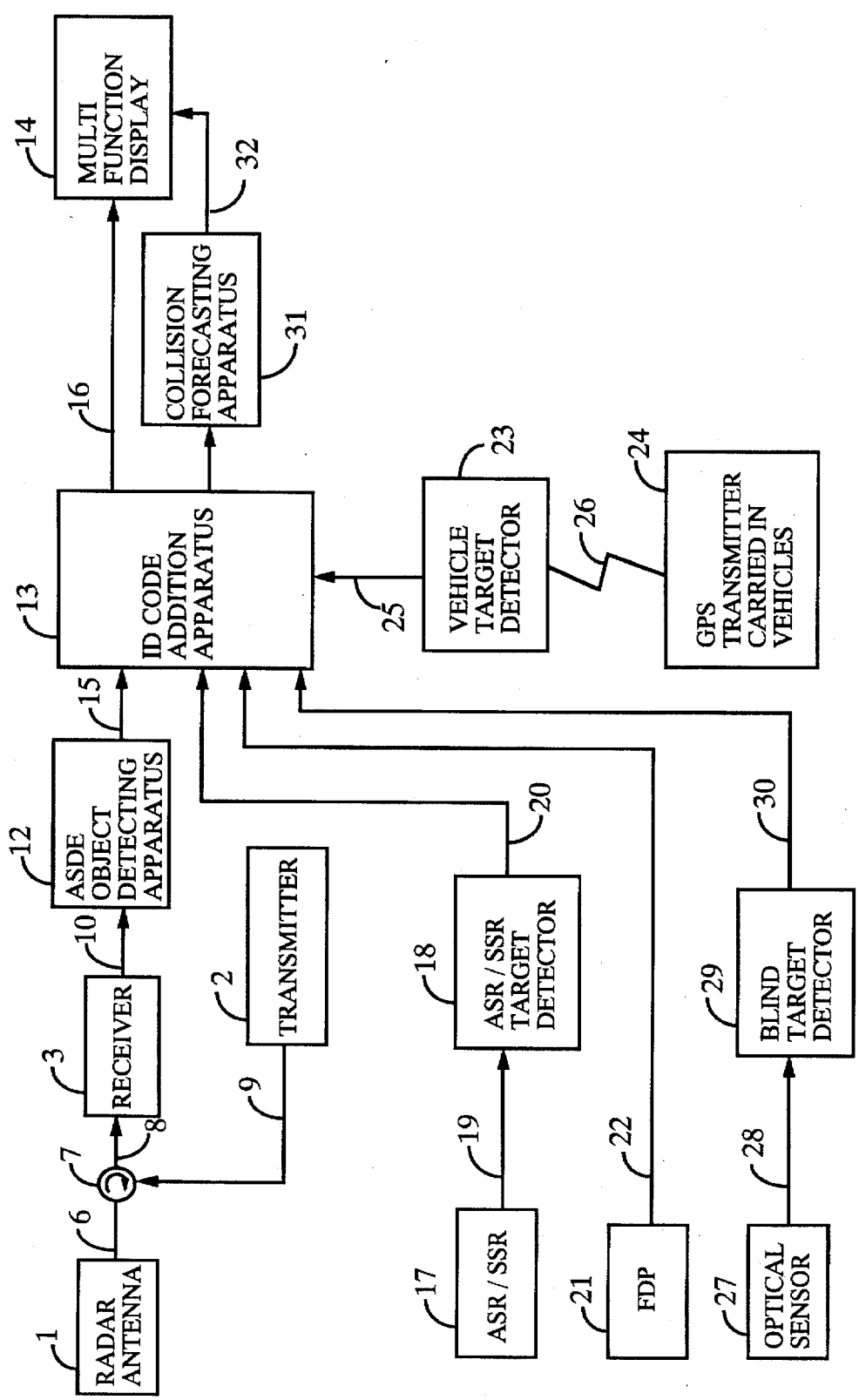
FIG. 13 is a functional block diagram which shows another embodiment of the invention.

It is possible to warn an abnormal access or a possible collision between airplanes or between vehicles and airplanes via multi-function display 14 by adding the collision forecasting apparatus 31 to the construction of the third embodiment. FIG. 13 is a functional block diagram showing an airport surface traffic system of the fourth embodiment. The elements having the same reference numbers in FIG. 13 as those of FIG. 1 are the same portions or the corresponding portions. Accordingly the detailed explanation of the same portions is omitted.

Figure 14:
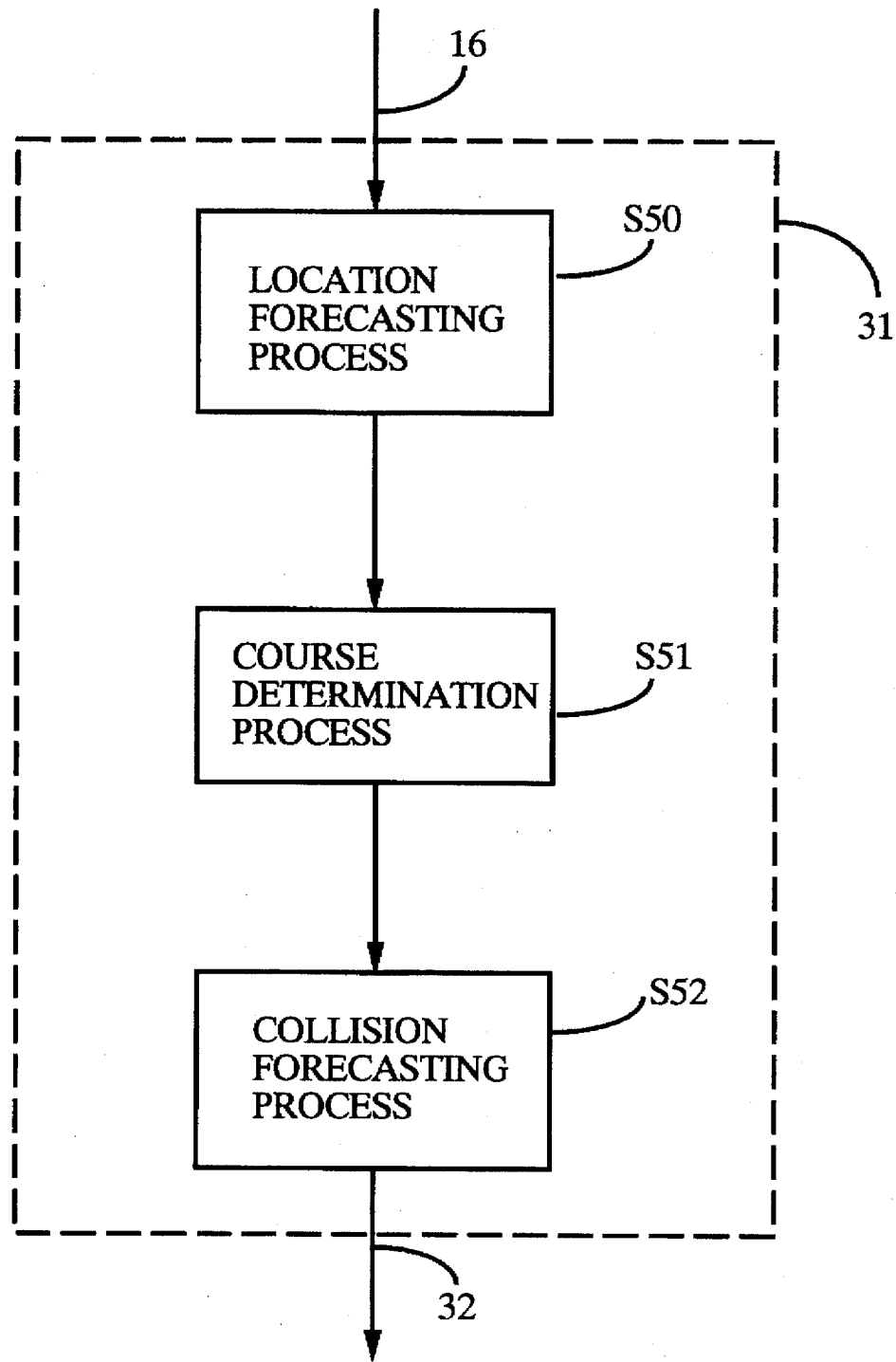
FIG. 14 shows a process chart which shows another embodiment of the invention.

An operation of the fourth embodiment is now explained with FIG. 14. FIG. 14 shows a process chart of the collision forecasting apparatus 31. A location forecasting process of step S50 uses a tracking filter to forecast next scanning locations of all targets displayed in one scan according to display data 16 containing locations of airplanes from ID code addition apparatus 13. A course determination process of step S51 forecasts future courses from the past location, velocity and acceleration rate of targets. A collision forecasting process of step S52 forecasts possibility of future collisions from the information of step S51, and outputs a collision warning signals if there are dangers of collision. Then, the warning is displayed via multi-function display 14.

As described above, since a collision forecasting warning is notified to air traffic controllers via multi-function display 14, airport safety is more assured.

Embodiment 5

Figure 15:
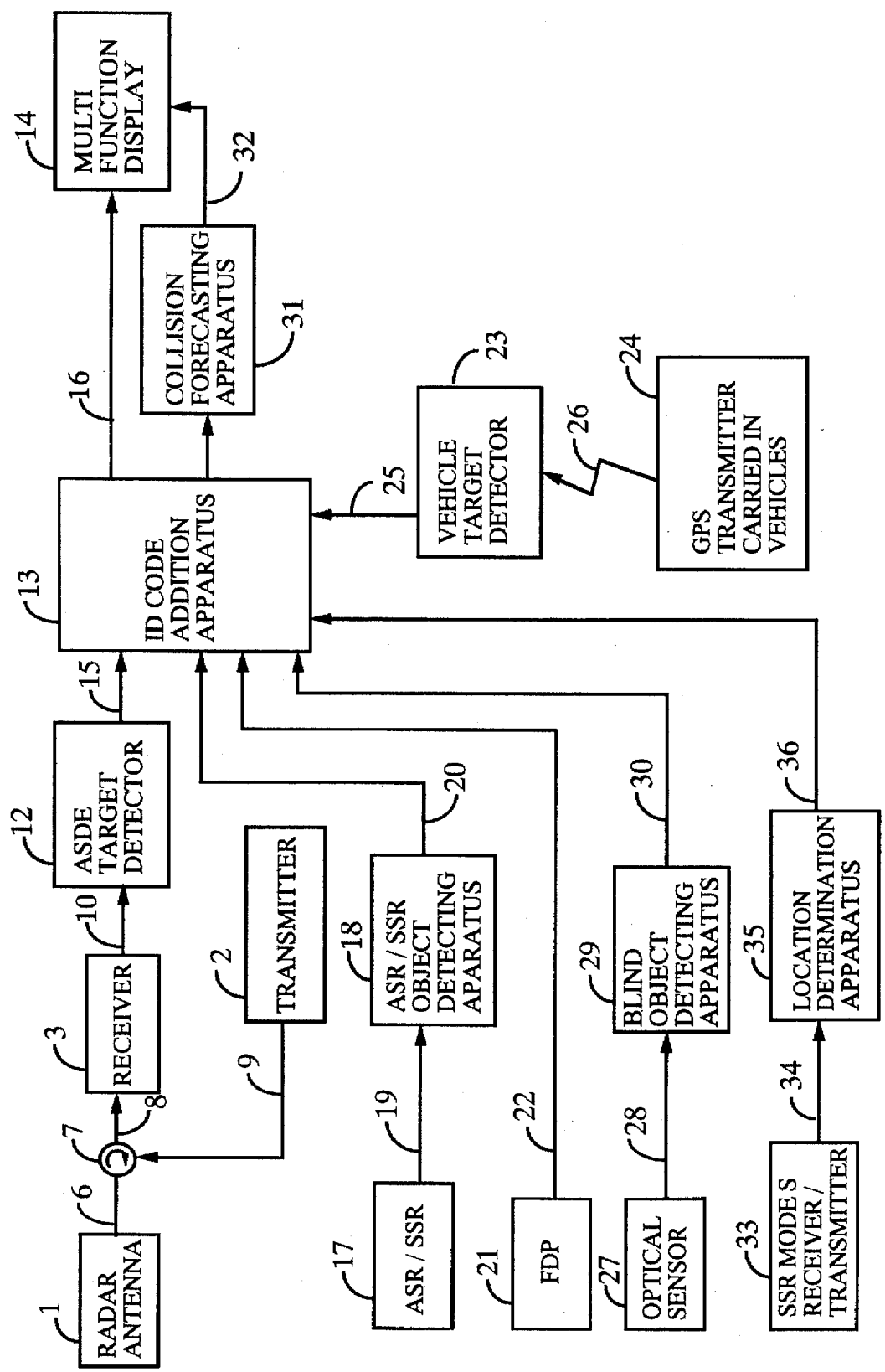
FIG. 15 is a functional block diagram which shows another embodiment of the invention.

It is possible to add airplane ID codes to departing airplanes by connecting SSR mode-S transmitter/receiver 33 and a location determination apparatus 35 to the construction of the above embodiment, and detecting a location and a beacon code of airplanes carrying a SSR mode-S transmitter. A fifth embodiment is now explained. FIG. 15 is a functional block diagram showing an airport surface traffic system of the fifth embodiment. The elements having the same reference numbers in FIG. 15 as those of FIG. 1 are the same portions or the corresponding portions. Accordingly the detailed explanation of the same portions is omitted.

Figure 16:
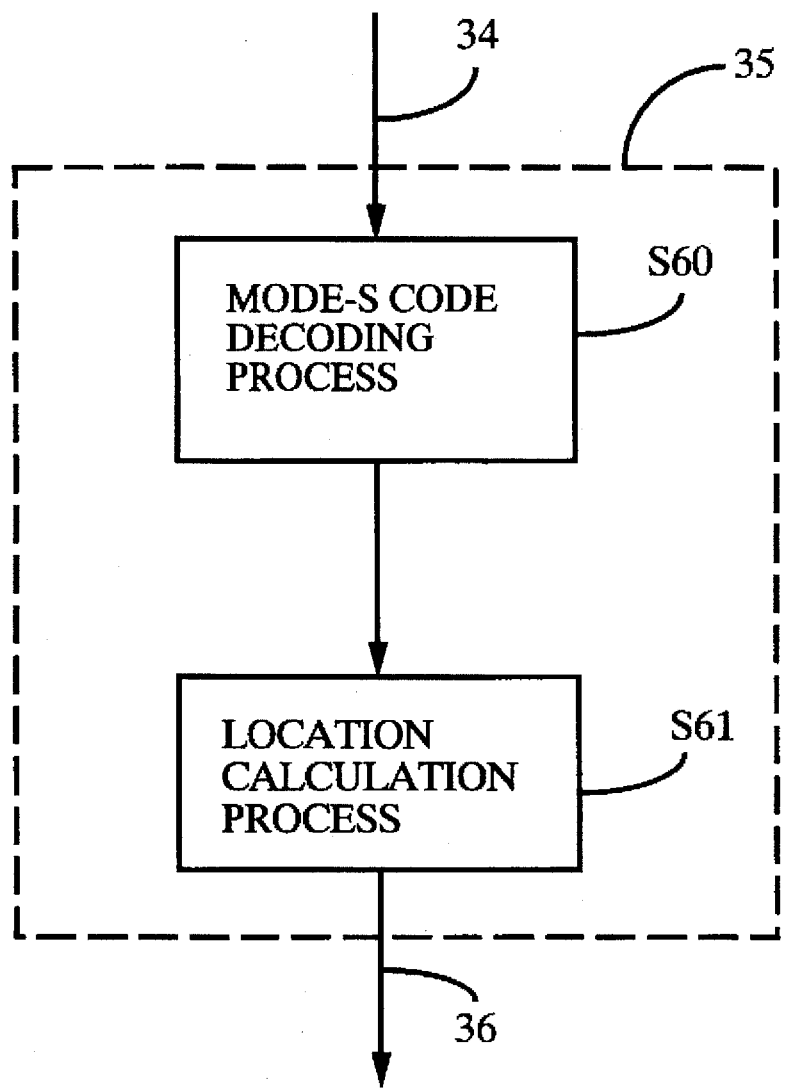
FIG. 16 shows a process chart which shows another embodiment of the invention.
Figure 17:
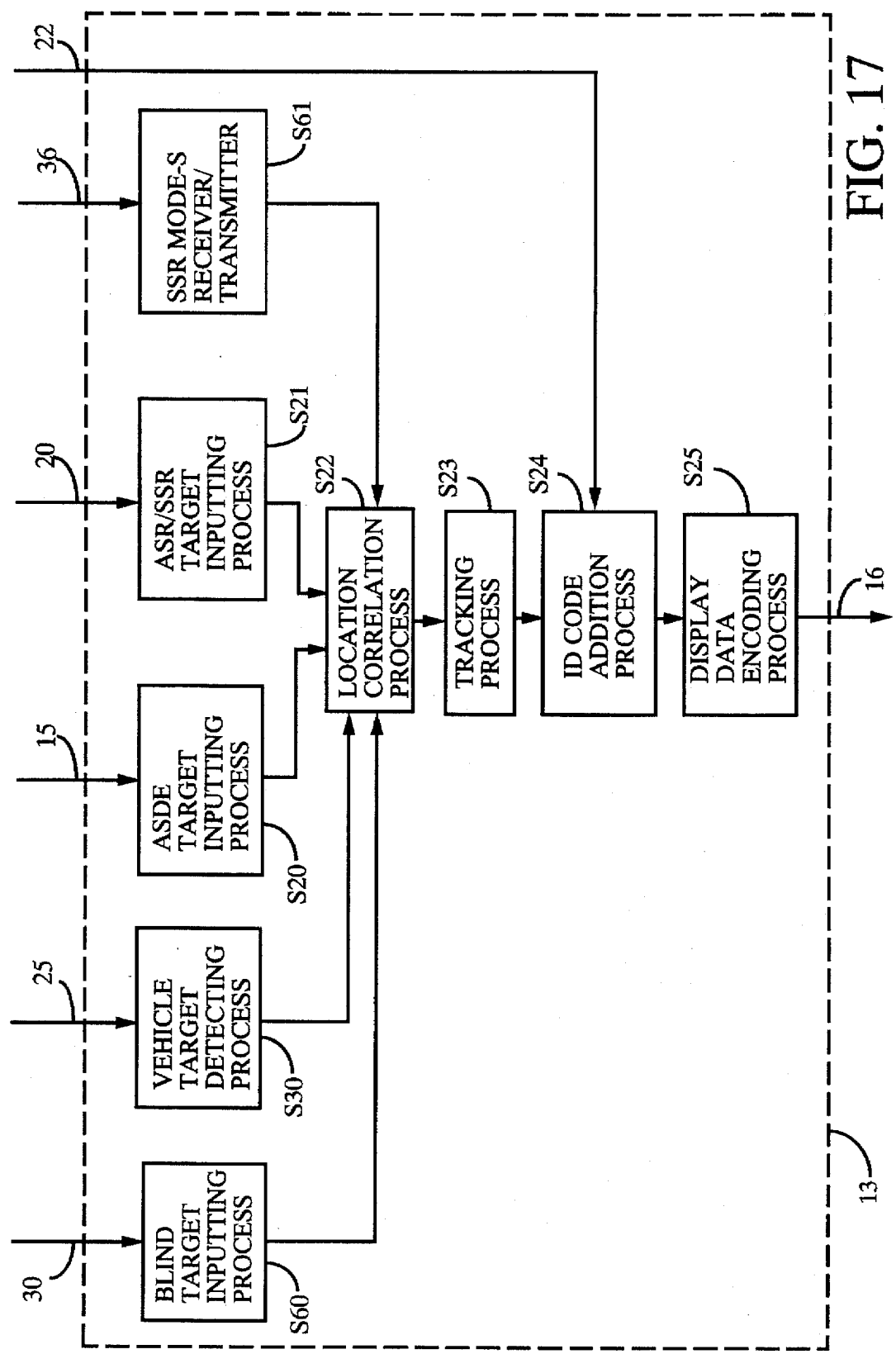
FIG. 17 shows a process chart which shows another embodiment of the invention.

Operation is now explained using FIG. 15, FIG. 16 and FIG. 17. Since airplanes carrying an SSR mode-S transmitter is capable of individual inquiries, the airplane gives SSR mode-S inquiries signal and receives response signals by SSR mode-S receivers 33 which are set at least three places and then outputs a reception signal 34 to location determination apparatus 35. As shown in the process chart of FIG. 16, the location determination apparatus 35 decodes SSR mode-S response signal (a response signal received from airplane carrying transponder corresponding to SSR mode-S) at mode-S code decoding process of step S60. The location determination apparatus 35 then determines target location by a triangle measurement using a difference of arrival time of reception signals from SSR mode-S transmitter/receiver 33 which are equipped at three different places, and outputs location information and beacon codes.

The process of ID code addition apparatus 13 is the same as that of the first embodiment. As shown in a process chart of FIG. 17, SSR mode-S inputting process of step 61 coordinates ASDE target input signal of step 20 and ASR/SSR target input signal of step 21.

Since error ranges of location obtained by a location determination apparatus 35 and error ranges of location obtained by ASDE target detector 12 do not exactly match, a location correlation is calculated to identify targets to be in the same location in consideration of errors, if centers of targets do not accord but the targets are within a predetermined area. In step S23, a tracking filter tracks targets of which correlation process of locations have been finished, and then outputs location information and ID codes to a multi-function display 14 in order to display symbols of the targets by means of graphic drawing.

As described above, since targets taking off is automatically detected and also ID codes are added, duties of the air traffic controllers are reduced and airport safety is more assured.

What is claimed is:

1. An airport surface traffic control system, comprising:

an airport surface detection radar for receiving reflected radar signals from targets moving in an airport;

a first target detector for outputting location information of targets by calculating target locations obtained from a signal outputted from the airport surface detection radar;

a first monitoring radar for receiving reflected radar signals from airborne targets in an area around said airport;

a second monitoring radar for receiving response signals including beacon codes from said airborne targets;

a second target detector for outputting location information and beacon code information of targets in response to target location information from the first monitoring radar and signals from the second monitoring radar;

a flight schedule information processor for outputting aircraft flight schedule information;

an ID code addition apparatus for identifying targets and their locations in response to location information outputted from the first and the second target detectors and developing target display data signals corresponding to said targets and their locations, adding ID codes to said display data signals according to the beacon code information and the flight schedule information, and outputting said display data signals; and a display apparatus for indicating locations of targets moving on the airport surface and symbols and ID codes corresponding to the targets in response to said display data signals from the ID code addition apparatus.

2. The airport surface traffic control system of claim 1, further comprising:

a GPS (Global Positioning System) transmitter carried on target airplanes for transmitting location information and ID code information of the targets which are calculated in response to signals received from the GPS satellite; and a third target detector for receiving location information and ID code information of targets from GPS transmitter and decoding, and outputting said target locations and said ID code information to the ID code addition apparatus;

where, the system determines targets and their locations according to location information of the first and the third target detectors, adds ID codes according to said code information received from the third target detector, and outputs location information and ID codes of the targets as display data.

3. The airport surface traffic control system of claim 2, further comprising:

an optical sensor for detecting areas where the airport surface detection radar can not detect; and a fourth target detector for outputting location information of targets to the ID code addition apparatus according to said optical sensor;

where, the system determines targets and their locations according to location information of the first and the fourth target detectors.

4. The airport surface traffic control system of claim 3, further comprising:

a collision forecasting apparatus for calculating possibility of future collision according to location change of the targets obtained from display data which are displayed on the ID code adding apparatus, and outputting a collision warning signal to the multi-function display when there is a risk of a collision;

where, the system forecasts collision warning according to the collision forecasting warning signal.

5. The airport surface traffic control system of claim 4, further comprising:

at least three SSR mode-S receivers for receiving SSR mode-S responses from the targets which are taking off and outputting reception signals; and a location determination apparatus for determining location of targets according to reception signals from SSR mode-S receivers, and outputting location information and beacon code information of the targets to ID code addition apparatus;

where, the system determines targets and their locations according to location information and the first target detector, and adds ID codes according to said beacon code information from the location determination apparatus.

6. An airport surface traffic control system according to claim 1, wherein said first target detector calculates target location by detecting peaks of magnitudes as targets, comparing magnitudes of distance direction and azimuth direction with given data, and calculating central locations of each target.

7. An airport surface traffic control system according to claim 1, wherein said display apparatus comprises a multi-window display for digitally displaying multiple windows corresponding to airport surface traffic activity together with ID codes.

* * * * *

UNITED STATES PATENT AND TRADEMARK OFFICE
CERTIFICATE OF CORRECTION

PATENT NO. : 5,670,961
DATED : September 23, 1997
INVENTOR(S) : Atsushi Tomita et al.

It is certified that error appears in the above-indentified patent and that said Letters Patent is hereby corrected as shown below:

Col. 5, line 13, delete "an"; Col. 6, line 38, "GSPS" should be -- GPS --.

Signed and Sealed this

Twenty-fourth Day of March, 1998

Attest:

BRUCE LEHMAN

*Attesting Officer*          *Commissioner of Patents and Trademarks*